(12) United States Patent
Kulczyk

(10) Patent No.: US 9,068,503 B2
(45) Date of Patent: Jun. 30, 2015

(54) SYSTEM AND METHOD FOR DETECTING ABNORMAL MOVEMENT IN A GAS TURBINE SHAFT

(75) Inventor: Wojciech Konrad Kulczyk, Hampshire (GB)

(73) Assignee: Weston Aerospace Limited, Hampshire (GB)

( * ) Notice: Subject to any disclaimer, the term of this patent is extended or adjusted under 35 U.S.C. 154(b) by 403 days.

(21) Appl. No.: 13/617,063

(22) Filed: Sep. 14, 2012

(65) Prior Publication Data

US 2013/0071230 A1  Mar. 21, 2013

(30) Foreign Application Priority Data

Sep. 16, 2011 (GB) .................................. 1116142.9

(51) Int. Cl.
*G01M 15/14* (2006.01)
*F02B 51/04* (2006.01)
*F02B 51/06* (2006.01)

(52) U.S. Cl.
CPC ................. *F02B 51/04* (2013.01); *F02B 51/06* (2013.01); *F02G 2254/10* (2013.01); *Y02T 10/126* (2013.01)

(58) Field of Classification Search
CPC ....................................................... G01M 15/14
USPC ....................................................... 73/112.01
See application file for complete search history.

(56) References Cited

U.S. PATENT DOCUMENTS

| | | | |
|---|---|---|---|
| 4,656,875 A * | 4/1987 | Uitermarkt | 73/862.045 |
| 4,763,533 A * | 8/1988 | Uitermarkt | 73/862.045 |
| 5,411,364 A | 5/1995 | Aberg | |
| 6,607,349 B2 | 8/2003 | Mulera | |
| 2003/0122682 A1 | 7/2003 | Gass | |
| 2007/0241921 A1 | 10/2007 | Arguello | |
| 2009/0177363 A1* | 7/2009 | Kulczyk et al. | 701/100 |
| 2009/0177433 A1* | 7/2009 | Palmer et al. | 702/145 |
| 2009/0177434 A1* | 7/2009 | Kulczyk et al. | 702/145 |

FOREIGN PATENT DOCUMENTS

WO        2007028354        3/2007

OTHER PUBLICATIONS

Search Report dated Jan. 12, 2012 for related British patent application 1116142.9, 1 page.

* cited by examiner

*Primary Examiner* — Eric S McCall
(74) *Attorney, Agent, or Firm* — Fredrikson & Byron, P.A.

(57) ABSTRACT

A sensor element for use in a backing sensor to monitor a gas turbine shaft. The sensor includes an oscillator circuit 30 having an oscillator and a resonance circuit 42, and a frequency detector 31 for monitoring the frequency of the oscillation circuit. Abnormal movement of the shaft cuts the circuit in the sensor along a cutting line (15). The cutting of the sensor changes the capacitance and/or inductance of the resonance circuit and thereby changes the frequency of oscillation.

13 Claims, 4 Drawing Sheets

SYSTEM AND METHOD FOR DETECTING ABNORMAL MOVEMENT IN A GAS TURBINE SHAFT

The present invention is concerned with a sensor and a system for detecting abnormal movement of a gas turbine shaft. Abnormal movement of a gas turbine shaft is normally associated with the breaking of the shaft and the risk of so-called "turbine over-speed". The invention is particularly suitable for jet engine shafts. When the shaft of, for example, a jet engine breaks, the compressor mass is lost to the rotating system so the shaft and turbine then rotates significantly more quickly. The movement of the turbine when the shaft breaks can be sufficiently fast to cause the turbine to fly apart and break.

BACKGROUND OF THE INVENTION

Gas turbine engines (e.g. jet engines) include a rotating shaft having compressor and/or turbine blades mounted thereon and rotating therewith. Axial movement of the shaft relative to the remainder of the engine is considered to be an abnormal movement and indicative of engine failure (e.g. shaft breakage). Detection of axial movement of the shaft relative to the remainder of the engine can therefore be used to detect engine failure and used to prevent further damage to the engine by activating a shut off of the engine. A shaft links the turbine and compressor. If the shaft is broken, the turbine portion moves backwards because of the effect of combustion gases. The compressor elements would lose power and stop rotating.

It is known to detect abnormal movement of a gas turbine shaft relative to the engine casing by providing a circuit breaking element which is fixed to the shaft and moves therewith if and when the shaft moves in an axial direction. Movement of the circuit breaking element relative to the shaft breaks a circuit and thereby produces a signal.

U.S. Pat. No. 5,411,364 discloses an electro optic sensor for sensing unwanted or abnormal axial movement of turbine blades or rotors of a gas turbine. The sensing arrangement includes a pair of fibre optic wave guides interconnected through a frangible member disposed axially adjacent the turbine blades. Upon axial movement of the blades or rotors away from their normal position, the frangible element is broken to open the optical circuit associated with the wave guides. Associated electronic circuitry generates an output signal indicative of failure of the gas turbine rotor.

U.S. Pat. No. 6,607,349 discloses a broken shaft detection system and a method which uses a detector assembly mounted downstream of a power turbine wheel of a gas turbine engine to detect rearward axial motion of the wheel and thereby a broken shaft event. The detector assembly has a plunger positioned to be axially displaced against a link connected in an electrical circuit. The link may be broken when the plunger is displaced thereby creating an open circuit that may be detected by a detection and test element. The breaking may be communicated to an over-speed circuit that controls a shut off switch that interrupts fuel flow to the engine. The link may be connected to the detection and test element by two pairs of parallel wires to facilitate monitoring of circuit function and to detect failures that are not broken shaft event failures.

US 2007/0241921 discloses a frangible sensor element which is cut by a separating tang mounted on and moving axially with a gas turbine shaft when the shaft fails. The frangible sensor element includes a longish, mechanically severable sensor element, which is severed by the separating tang when this moves as a result of shaft failure. One embodiment of US 2007/0241921 has a circuit formed by two wires connected at the distal or free end of the sensor element by a resistor of a defined value, and another embodiment has a circuit in which two pairs of wires are looped or bent at the free or distal end of the sensor element to define a single continuous conductive path running from the proximal end of the frangible sensing element, to its distal end, then back to its proximal end before returning to its distal end and then returning to its proximal end.

A problem with the arrangement of US 2007/0241921 which relies on monitoring changes in current (and hence resistance) caused by the switch from a first resistive circuit to a second different resistive circuit is that the values of resistance vary with temperature. The resistance of the resistor elements themselves can vary significantly with temperature. Furthermore in sensors including circuits such as that described in US 2007/0241921, the wires are located within an insulating sheath (the conductive wires and insulating sheath being elements of a MI or mineral insulated cable as disclosed in WO 2007/028354) and the high operating temperatures (can be of the order of or exceed 800° C.) also significantly affect the insulation resistance of the cable. As jet engines and other gas turbines are high temperature environments, there is therefore a risk of a false alarm. This means that such sensors have small operating margins.

It is very important to avoid false alarms. Typically the sensor monitoring for shaft breakage is directly coupled to an engine cut-off to automatically and very quickly shut off the engine when the shaft breaks. False alarms therefore lead to the engine stopping when there is no need to do so. For a jet having two engines, turning one off unnecessarily has a clear risk.

In arrangements such as that disclosed in US 2007/0241921 and WO 2007/028354 which monitor signal amplitudes, the input signal amplitude is affected by many parameters (including supply voltage, amplifier gain, and resistance values). These parameters depend on, or are affected by, other parameters such temperature. It is difficult to keep a signal amplitude consistent over long operating periods as is required for effective and accurate operation. Keeping the input signal amplitude consistent over long operating periods requires special stabilization of power supply, special compensating resistors and a special design of amplifiers. This makes the measuring system expensive and complex.

As mentioned above arrangements such as those of US 2007/0241921 and WO 2007/028354 are also sensitive to the insulation resistance of the connected cable. It is well known that insulation resistance of mineral insulated cables varies with temperature and at high temperatures is very low affecting values of the measured resistance and this way potentially causing a false alarm.

BRIEF SUMMARY OF THE INVENTION

The present invention provides a sensor for detecting abnormal movement of a gas turbine shaft, comprising:

a frangible or severable sensor element having a first end proximal to a sensor connector or output and a second end distal from the sensor connector or output, the sensor element having a cutting plane towards the distal end of the sensor element and being for cutting by a cutter or separator coupled to or moveable with the gas turbine shaft, the sensor including a first oscillator circuit comprising an electronic amplifier and a first tuned resonance circuit including a first inductance and a first capacitance, the first oscillator circuit being oscillatable at a first frequency determined by the first inductance and the first capacitance, and wherein cutting of the frangible sensor element along the cutting plane cuts a conductor to form a second tuned or resonance circuit connected to the amplifier and having a second inductance and/or a second capacitance, the second inductance and/or the second capacitance being different to the first capacitance and/or first inductance such that the electronic amplifier and second tuned or resonance circuit form a second oscillator circuit oscillatable at a different frequency to the first oscillator circuit.

The values of capacitance and inductance are in general not much affected by temperature variations and therefore the frequency of the oscillator is not as badly affected by high temperature, or temperature changes, as known backing sensor arrangements. Embodiments of the invention therefore may provide much more reliable operation than the detection of the value of the resistive network described in, for example, US 2007/0241921 or WO 2007/028354. The resistance measuring circuit in arrangements such as that of US 2007/6241921 is of an analogue type and is therefore subject to variations in a number of operational parameters (e.g., voltage supply, cable insulation resistance). The system of US 2007/0241921 is, therefore, vulnerable to false alarms.

In embodiments of the invention, it is necessary that the total inductance and/or capacitance of the oscillator circuit changes. This can be achieved by disconnecting one or more components having a capacitance, or an inductance or both.

Preferably the sensor includes a first capacitor, a first inductor, and a second inductor which forms at least part of the tuned or resonance circuit of the first oscillator circuit, and wherein the first capacitor and the first inductor are connected to the second inductor by a conductor which passes through the cutting plane such that movement of the cutter or separator along the cutting plane disconnects the second inductor from the remainder of the oscillator circuit such that the tuned or resonance circuit of the second oscillator circuit does not include the second inductor.

This arrangement creates a circuit which in the uncut configuration has an additional inductor relative to the cut configuration. The cut and uncut configurations therefore have different resonant frequencies or frequencies of oscillation. Preferably the sensor includes a first capacitor, a first inductor, and a second capacitor which forms at least part of the tuned or resonance circuit of the first oscillator circuit, and wherein the first capacitor and the first inductor are connected to the second capacitor by a conductor which passes through the cutting plane such that movement of the cutter or separator along the cutting plane disconnects the second capacitor from the remainder of the oscillator circuit such that the tuned or resonance circuit of the second oscillator circuit does not include the second capacitor. This arrangement creates a circuit which in the uncut configuration has an additional capacitor relative to the cut configuration. The cut and uncut configurations therefore have different resonant frequencies or frequencies of oscillation.

Preferably the inductor or inductors include an air cored coil. The inductance of an air cored coils is relatively resistant to temperature so that such inductors are relatively stable in high temperature environments.

Preferably the capacitors and inductors are all located on the proximal side of the cutting plane of the sensor. This allows one to position these components away from the distal end of the sensor which, in use, sits inside the turbine and is therefore subject to an aggressive high temperature operating environment.

Preferably the amplifier, capacitors and inductors are located towards or at the proximal end of the sensor element. The proximal end of the sensor is, in use, in a lower temperature operating environment.

Preferably the oscillator circuits are coupled to a frequency detector for monitoring the frequency of oscillation of the oscillatable electrical circuit.

Preferably the frequency detector triggers an alarm when the frequency of oscillation changes by more than a predetermined threshold value.

Preferably the gas turbine is a jet engine.

Preferred embodiments of the present invention will now be described, by way of example only, with reference to the attached figures.

BRIEF DESCRIPTION OF THE DRAWINGS

The figures and following description are intended to exemplify the invention and it will be readily appreciated that alternative embodiments of the invention are envisaged and are covered by the scope of the claims.

DETAILED DESCRIPTION OF THE INVENTION

Figure 1:
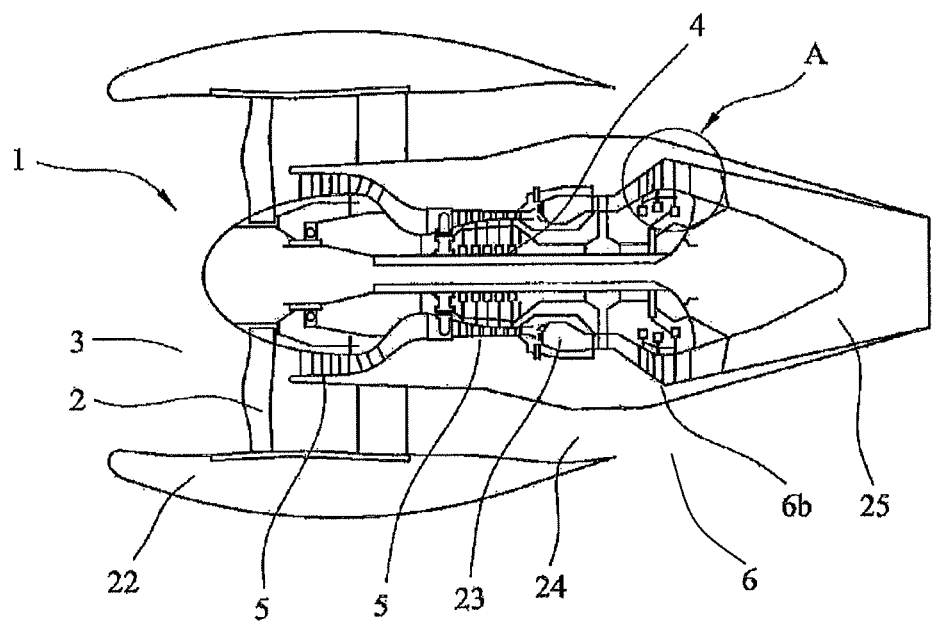
FIG. 1 shows a two spool turbo fan engine illustrating the location of a sensing system including a sensor embodying the invention.

FIG. 1 shows a typical two spool turbo fan, jet engine (1) having an intake (3), fan (2), nacelle (22), compressors (5), combustion chamber (23), fan nozzle (24), turbines (6) and core nozzle (25).

The engine (1) includes a fan (2) across the air intake (3). The fan (2) is mounted on a shaft (4) on which are also mounted the compressor rotors or blades (5) and the turbine rotors or blades (6). A so-called backing sensor (7) is located adjacent and behind the low pressure turbine rotors (6b).

Figure 2:
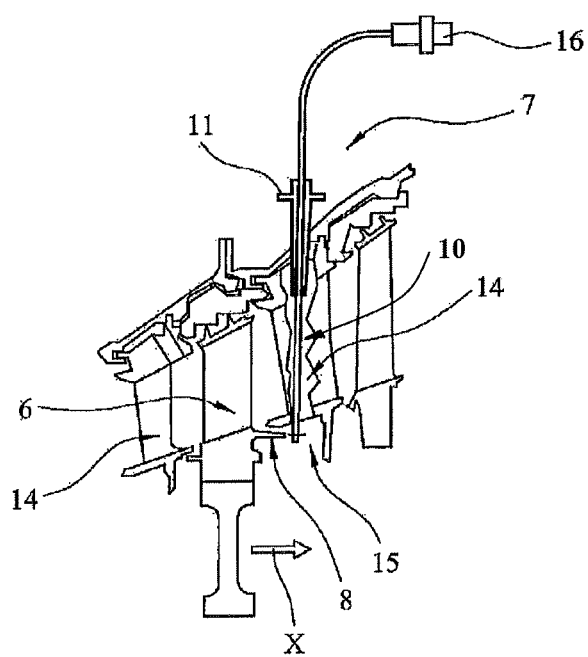
FIG. 2 is an enlarged view of the portion A of FIG. 1 including the sensing system.

As shown in more detail in FIG. 2, the rotatable shaft (4) has a cutter or separator (8) mounted thereon and axially movable with the shaft. The backing sensor (7) has a flange mounting (11) and is mounted in a hole in the engine casing, and has an elongate frangible element (10) and a connection portion coupled thereto and extending through the flange mounting (11) and a fixed vane (14) of the engine. The frangible elongate element (10) projects below the fixed vane (14) opposite the cutter or separator (8) so that it is cut or separated along a cutting or parting plane (15) when the shaft moves towards the back of the engine (i.e. axially to the right in direction X when looking at FIGS. 1 and 2).

The backing sensor (7) has a connector (16) for connecting the sensor to control and sensing electronics and/or data processing. The connector (16) can also house those parts of the sensor which are heat sensitive in the manner described in US 2007/0241921, and as described in more detail below with reference to FIGS. 4 and 7.

The portion of the turbine in which the sensor element is located is, when the jet engine is in use, a high temperature environment. Temperatures in the engine can exceed 800° C. which means that the environment in which the free or distal end of the sensor element is located is an aggressive one. Furthermore and as can be seen from FIG. 2, space is limited in the engine for the sensor element.

An electronic oscillator is an electronic circuit that produces a repetitive electronic signal at a frequency of f. A common form of oscillation is a linear oscillator circuit formed by a electronic amplifier such as a transistor or op amp (operational amplifier) connected in a feedback loop with its output fed back into its input through a frequency selective electronics filter to provide positive feedback. When the power supply to the amplifier is first switched on, electronic noise in the circuit provides a signal to get oscillations started. The noise travels around the feed back loop and is amplified and filtered until it quickly becomes a wave at a single frequency of f.

In an LC oscillator circuit, the filter is a tuned circuit (the tank circuit) consisting of an inductor (L) and a capacitor (C), connected together. The resonant frequency f. of an oscillator circuit having an inductance L and a capacitance C arranged in parallel is given by:

$$f = \frac{1}{2\pi\sqrt{L \times C}} \quad (1)$$

Figure 3:
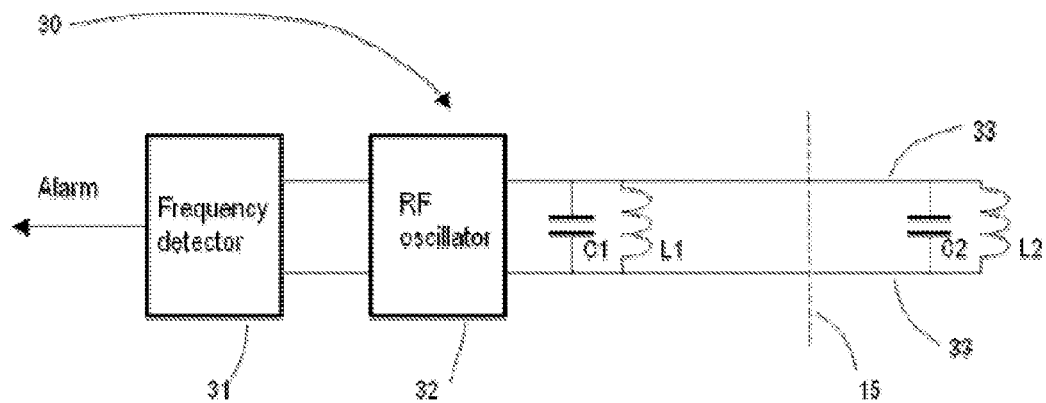
FIG. 3 is a circuit diagram illustrating the operation of an oscillator circuit system suitable for use with embodiments of the present invention.
Figure 4:
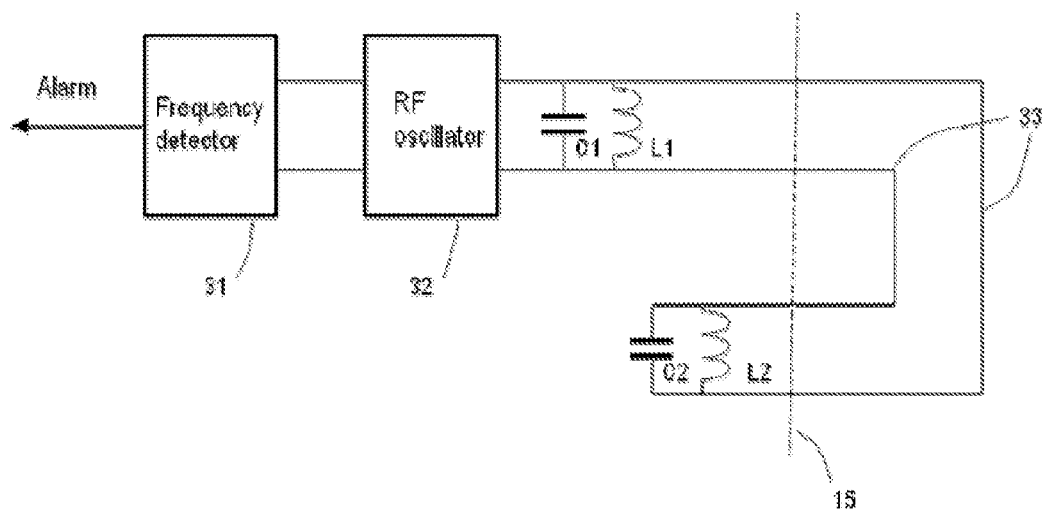
FIG. 4 is a schematic illustration of an embodiment of the invention.

Referring to FIGS. 3 and 4, a backing sensor includes an oscillator circuit (30), a frequency detector (31). The oscillation circuit includes an oscillator (32), two capacitances C1, C2 and two inductances L1, L2 which together produce an oscillating output of frequency f. The frequency detector is a separate circuit which received a signal the from oscillator circuit and detects or monitors changes in the frequency of oscillations in the oscillator.

FIG. 3 is a simple diagram illustrating the theory behind the invention. The capacitances and inductances in FIG. 3 are all arranged in parallel with a first inductance (L1) and a first capacitance (C1) being on the connector side of the cutting plane (15) and a second inductance (L2) and a second capacitance (C2) on the distal side of the cutting plane (15).

As described above, the frequency f of an oscillator circuit having an inductance L and a capacitance C arranged in parallel is given by:

$$f = \frac{1}{2\pi\sqrt{L \times C}}$$

Therefore, for an arrangement such as that of FIG. 3 with the cutting plane uncut having two capacitances C1, C2 and two inductances L1, L2 all arranged in parallel, the uncut frequency (fu) is given by:

$$fu = \frac{1}{2\pi\sqrt{Lu \times Cu}} \quad (2)$$

where $$Lu = \frac{(L1 \times L2)}{L1 + L2} \quad (3)$$

$$Cu = C1 + C2 \quad (4)$$

When the shaft (4) of a gas turbine is broken, it will be displaced axially and the cutter (8) attached to the shaft will move along the cutting plane (15) to cut the connectors (33) along the cutting plane. The components L2 and C2 are then disconnected from the remainder of the oscillator circuit and the cut frequency fc is given by:

$$fc = \frac{1}{2\pi\sqrt{L1 \times C1}} \quad (5)$$

The frequency detector (31) is arranged to detect the change in frequency from fu to fc and hence trigger an alarm when the change in frequency is above a defined threshold value ft. The frequency detector could be of a digital type using frequency counters. The digital system would have in its memory preset threshold frequency values which would trigger an alarm.

The change in frequency Δf is given by:

$$\Delta f = fc - fu \quad (6)$$

For reliable operation of the system, the values of capacitance C1, C2 and inductance L1, L2, and the threshold frequency ft should be selected such that Δf and ft are sufficiently large that the alarm is not triggered by changes caused by errors. Possible errors include changes in cable or wire capacitance and inductance at high frequencies, and/or changes in cable inductance due to changes in cable stress caused by, for example, vibration of the sensor and/or the cable.

Δf must also be large enough that the difference in frequency between the cut and uncut circuit configurations is significant and sufficiently large that it is easy to monitor and pick up.

The frequency f is calculated from equation 1 above as described above. When selecting the values of the capacitances C1, C2 and inductances L1, L2 it is important that frequency f not be too low as that would require large and bulky capacitance and inductance components. Frequency f is inversely proportional to the square root of the values of the capacitance and inductance product (see equation (1) above) and high values of inductance and capacitance would require large and bulky components. Conversely, if the frequency of operation f is too high, the capacitance and inductance of the connecting cable would become significant. Changes in the capacitance and inductance of the connecting cable would become significant and changes in the capacitance and inductance of the connecting cable can also be caused by temperature and mechanical stress which therefore can also affect the operating or resonant frequency f of the oscillator circuit.

Considering the upper and lower limits to the operating frequency set by the issues described above, operating frequencies f in the range of 1 to 2.5 MHz are a good compromise (with, for example, one of the cut or uncut circuit configurations having an operating or resonant frequency of about 1 MHz and the other configuration having an operating or resonant frequency of about 2.5 MHz) with the differences Δf between the cut and uncut circuits being of the order of 1 MHz. The skilled man will readily be able to chose appropriate components to achieve the desired effect. Example component values are described below with reference to FIGS. 5 and 6 but the skilled man will readily and easily appreciate that there are other possible values. The capacitances should have a low temperature coefficient so as to reduce the effect of temperature. Silicone capacitors such as those supplied by IPDiA and operating up to 250° C. offer suitable performance characteristics.

The inductors may be straightforward air cored inductances made by coils wound be on a ceramic former without a magnetic core. The appropriate number of coils can be determined by the various methods (including look-up tables and/or programmes simulating electrical circuits) known to the man skilled in the art.

In the embodiment illustrated in FIG. 4, all the inductive and capacitive components C1, C2, L1, L2 are placed close to the oscillator (32) (which may be outside the engine casing or even in the connector (16)) where the environment is less aggressive and difficult, and there is more space, than at the distal end of the sensor which is inside the engine where the environment is hot and unfriendly. The wires (33) connecting the first inductance/capacitance pair C1, L1 to the second inductance/capacitance pair C2, L2 are folded such that they lie at the distal end of the sensor (7) which sits in the engine and across the cutting line (15).

Any type of electronic oscillator can be used for this application. Suitable known oscillators include the known Colpitts, Hartley, Clapp, Seiler, Armstrong, delay line, Pierce, phase-shift, Wien Bridge, Twin-T, cross-coupled LC, Vackar and Opto-electronic oscillators. The important element is that one or more connectors pass through the cutting line (15) and are connected to a number of capacitors and inductors in such a way that cutting that connector or those connections creates an oscillator circuit which oscillates at a different frequency to the circuit formed before the connection or connections are cut. In FIGS. 3 to 7, two connections or conductors (3) cross the cutting plane (15). Different oscillator circuits may have a different number of conductors or connectors crossing the cutting plane to achieve the desired result.

Figure 5:
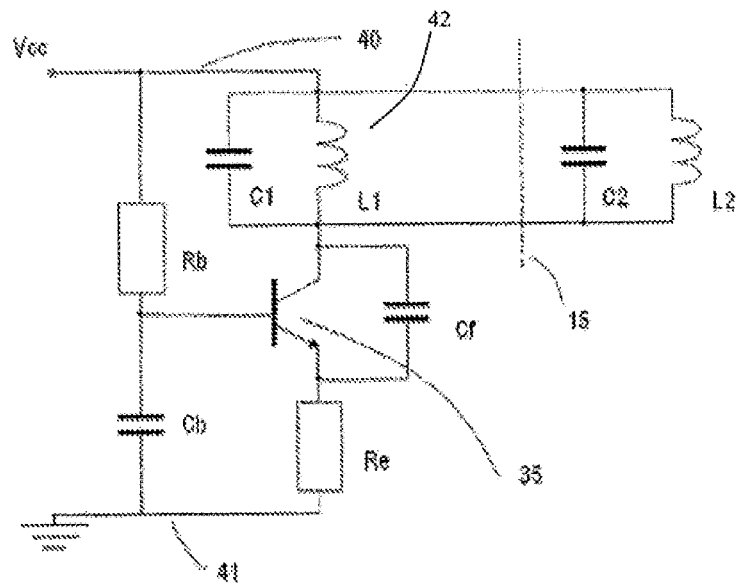
FIG. 5 is a circuit diagram of an embodiment of the invention using a Colpitt oscillator circuit and having a removable or severable capacitor and inductor.
Figure 6:
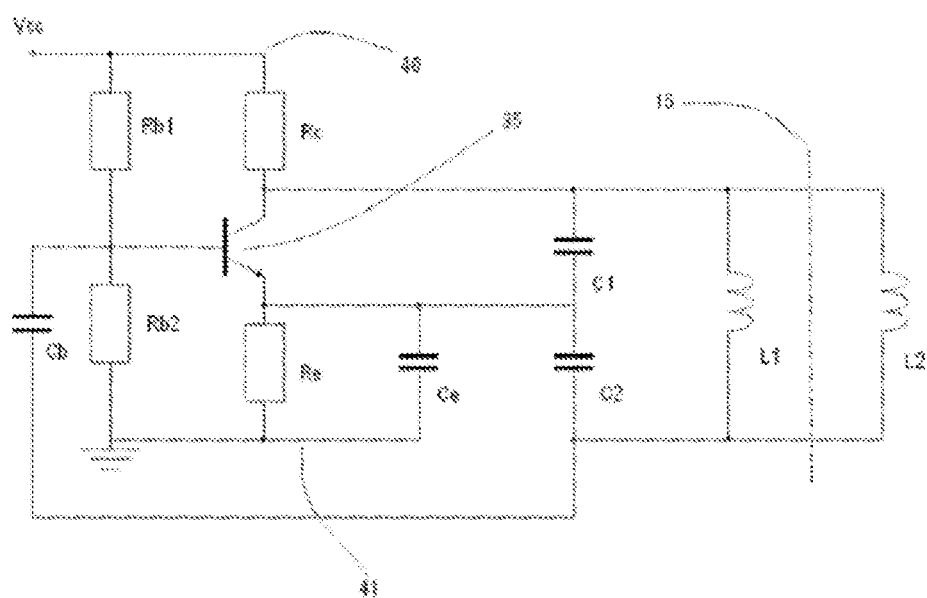
FIG. 6 is a circuit diagram of an embodiment of the invention using a Colpitt oscillator circuit and having a removable inductor.

FIGS. 5 and 6 are circuit diagrams illustrating Colpitts oscillator circuits embodying the invention.

The circuit shown in FIG. 5 is a Colpitts oscillator comprising an npn-type base junction transistor (35) where the transistor provides positive feedback to a resonant circuit in order to maintain oscillations in the resonant circuit. The circuit is powered by a voltage Vcc between a positive rail (40) and a ground rail (41). The base terminal of the transistor Q is coupled to the positive rail by a resistor Rb and to the ground rail by a capacitor Cb. The emitter terminal of the transistor Q is coupled by a resistor Re to the ground rail and by a capacitor Cf to the collector terminal of the transistor Q. The collector terminal of the transistor Q is coupled by a parallel resonant circuit (41) to the positive rail. The parallel resonant circuit comprises the tuned or resonant circuit. In the cut configuration where the circuit is cut along the cutting line (15). The parallel resonant circuit (42) comprises an inductor L1 and a capacitor C1 arranged in parallel between the collector terminal of the transistor Q and the positive rail. In the uncut configuration, the parallel resonant circuit comprises inductors L1 and L2 and capacitors C1 and C2, all arranged in parallel between the collector terminal of the transistor Q and the positive rail.

Possible values for the components in the circuit of FIG. 5 are as follows:
Rb=47 kΩ, Cb=100 nf, Re=220Ω, L1=L2=100 µH, C1=50 pF, C2=450 pF, and Cf=500 pF.

The circuit of FIG. 5 operates at frequency governed by Cf, C1, C2, L1 and L2. These values give an oscillation frequency for the circuit in the uncut configuration of about 1 MHz, and in the cut configuration of about 2.2 MHz.

The circuit shown in FIG. 6 is another Colpitts oscillator comprising an npn-type base junction transistor (35), where again the transistor provides positive feedback to a resonant circuit in order to maintain oscillations in the resonant circuit. The circuit is powered by a voltage Vcc between a positive rail (40) and a ground rail (41). The base terminal of the transistor Q is coupled to the positive rail by a resistor Rb1 and to the ground rail by a resistor Rb2. The collector terminal of the transistor Q is coupled to the positive rail by a resistor Rc. The emitter terminal of the transistor Q is coupled to the ground rail by a resistor Re and a capacitor Ce in parallel. The collector terminal of the transistor Q and the emitter terminal of the transistor Q are connected to each other by a capacitor C1. The emitter terminal of the transistor Q and the base terminal of the transistor Q are connected to each other by two capacitors C2 and Cb in series, with C2 closest to the emitter terminal of the transistor Q. The collector terminal is coupled to a node between C2 and Cb by an inductance. In the cut configuration, the inductance is provided by an inductor L1. In the uncut configuration, the inductance is provided by inductors L1 and L2 in parallel.

Possible values for the components in FIG. 6 are as follows: Rb1=47 kΩ, Rb2=11 kΩ, Re=220Ω, Cb=100 nf, Ce=100 nF, Rc=50Ω, C1=C2=200 pF, L1=250 µH, L2=50 µH.

The circuit of FIG. 6 operates at frequency governed by the parallel resonant circuit (42) of C1, C2 and L1 in the cut configuration and C1, C2, L1 and L2 in the uncut configuration. These values give an oscillation frequency for the circuit in the uncut configuration of about 2.4 MHz, and in the cut configuration of about 1 MHz.

In preferred embodiments the capacitors in the circuits of FIGS. 5 and 6 have temperature coefficients that are low in order to stabilize the oscillation frequency over the operating temperature range. Suitable capacitors include silicon capacitors such as those marketed by IPDiA. In operation in the uncut configuration, transient oscillations naturally occur in the resonant portions of each circuit. By themselves these oscillations would decay. However, the transistor is configured to provide positive feedback to the tuned or resonant circuits so that the oscillations are maintained. The cut configurations of the circuits of FIGS. 5 and 6 have an inductor and a capacitor removed from the tuned or resonant circuits. This causes the resonant frequency to change from that of the uncut configuration to the cut configuration, and the transistor maintains the oscillation frequency of the cut configuration. By monitoring the frequency of oscillation, it can be determined whether the circuit is in the cut configuration or the uncut configuration.

Embodiments of the invention make use of the fact that the frequency of oscillation of an electronic oscillator changes with changes in the inductance and/or capacitance of the tuned or tank circuit connected to the oscillator. References to the changes in the inductance and capacitance of the tuned or tank circuit, are references to changes in the total inductance or capacitance of the oscillator circuit and therefore include any inductance or capacitance of all elements in the circuit (including the wires or cables, the oscillator itself and the components external to the oscillator).

Figure 7:
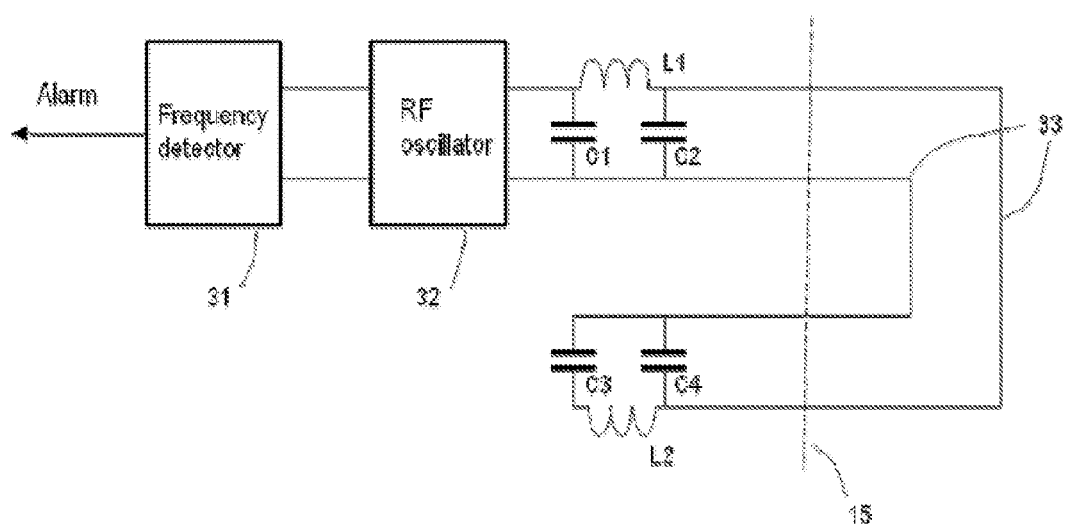
FIG. 7 is a schematic illustration of a further embodiment of the invention.

Depending on the design of the circuit, LC (i.e., inductive or capacitive) components could be arranged in various alternative configurations of which one is shown in FIG. 7. It is possible to use various combinations of L (inductive) and C (capacitive) components connected in series and parallel, and the described circuits are only an illustration.

In the embodiment of FIG. 7, if the cut ends of the wires (33) along the cutting plane are connected to short-circuit the capacitors C3, C4 and inductor L2, the oscillator circuit (30) continues to have both an inductance L1 and a capacitances C1 and C2 and therefore continues to oscillate.

The conductors or connector wires (33) could be screened, preferably mineral insulated cables, in a metal sheath suitable for operation and high temperatures and having a good mechanical integrity to thereby reduce the probability of accidental breakage.

The invention claimed is:

1. A sensor for detecting abnormal movement of a gas turbine shaft (4), comprising:
   a frangible or severable sensor element (11) having a first end proximal to a sensor connector or output (16) and a second end distal from the sensor connector or output (16), the sensor element (11) having a cutting plane (15) towards the distal end of the sensor element and being for cutting by a cutter or separator (8) coupled to or moveable with the gas turbine shaft (4),
   the sensor including a first oscillator circuit comprising an electronic amplifier and a first tuned resonance circuit including a first inductance and a first capacitance, the first oscillator circuit being oscillatable at a first frequency determined by the first inductance and the first capacitance,
   and wherein cutting of the frangible sensor element along the cutting plane (15) cuts a conductor (33) to form a second tuned or resonance circuit connected to the amplifier and having a second inductance and/or a second capacitance, the second inductance and/or the second capacitance being different to the first capacitance and/or first inductance such that the electronic amplifier and second tuned or resonance circuit form a second oscillator circuit oscillatable at a different frequency to the first oscillator circuit.

2. A sensor according to claim 1 wherein the sensor includes a first capacitor (C1) a first inductor (L1), and a second inductor (L2) which forms at least part of the tuned or resonance circuit of the first oscillator circuit, and wherein the first capacitor (C1) and the first inductor (L1) are connected to the second inductor (L2) by a conductor which passes through the cutting plane (15) such that movement of the cutter or separator along the cutting plane disconnects the second inductor (L2) from the remainder of the oscillator circuit such that the second tuned or resonance circuit of the second oscillator circuit does not include the second inductor.

3. A sensor according to claim 1 wherein the sensor includes a first capacitor (C1), a first inductor (L1), and a second capacitor (C2) which forms at least part of the tuned or resonance circuit of the first oscillator circuit, and wherein the first capacitor (C1) and the first inductor (L1) are connected to the second capacitor (C2) by a conductor which passes through the cutting plane (15) such that movement of the cutter or separator along the cutting plane disconnects the second capacitor (C2) from the remainder of the oscillator circuit such that the second tuned or resonance circuit of the second oscillator circuit does not include the second capacitor (C2).

4. A sensor according to claim 2 wherein the sensor includes a first capacitor (C1), a first inductor (L1), and a second capacitor (C2) which forms at least part of the tuned or resonance circuit of the first oscillator circuit, and wherein the first capacitor (C1) and the first inductor (L1) are connected to the second capacitor (C2) by a conductor which passes through the cutting plane (15) such that movement of the cutter or separator along the cutting plane disconnects both the second capacitor (C2) and the second inductor (L2) from the remainder of the oscillator circuit such that the second tuned or resonance circuit of the second oscillator circuit does not include either the second capacitor (C2) or the second inductor (L2).

5. A sensor according to claim 2 wherein the inductor or inductors include an air cored coil.

6. A sensor according to claim 3 wherein the inductor or inductors include an air cored coil.

7. A sensor according to claim 2 wherein the capacitors and inductors are located on the proximal side of the cutting plane (15) of the sensor.

8. A sensor according to claim 7 wherein the amplifier, capacitors and inductors are located towards or at the proximal end of the sensor element.

9. A sensor according to claim 3 wherein the capacitors and inductors are located on the proximal side of the cutting plane (15) of the sensor.

10. A sensor according to claim 9 wherein the amplifier, capacitors and inductors are located towards or at the proximal end of the sensor element.

11. A sensor according to claim 1 wherein the oscillator circuits are coupled to a frequency detector (31) for monitoring the frequency of oscillation of the oscillatable electrical circuit.

12. A system according to claim 11, wherein the frequency detector triggers an alarm when the frequency of oscillation changes by more than a pre-determined threshold value.

13. A system according to claim 1 wherein the gas turbine is a jet engine.

* * * * *